US011920112B2

(12) United States Patent
Hammel et al.

(10) Patent No.: US 11,920,112 B2
(45) Date of Patent: Mar. 5, 2024

(54) POWDER AND SOLID ALKALINE CLEANING COMPOSITIONS AND USE THEREOF FOR REMOVING GREASY SOILS

(71) Applicant: ECOLAB USA INC., Saint Paul, MN (US)

(72) Inventors: Devon Beau Hammel, Saint Paul, MN (US); Grace Marie Rapp, Saint Paul, MN (US)

(73) Assignee: ECOLAB USA INC., Saint Paul, MN (US)

(*) Notice: Subject to any disclaimer, the term of this patent is extended or adjusted under 35 U.S.C. 154(b) by 0 days.

(21) Appl. No.: 17/819,045

(22) Filed: Aug. 11, 2022

(65) Prior Publication Data

US 2023/0090860 A1 Mar. 23, 2023

Related U.S. Application Data

(63) Continuation of application No. 16/451,790, filed on Jun. 25, 2019, now Pat. No. 11,441,107.

(60) Provisional application No. 62/689,906, filed on Jun. 26, 2018.

(51) Int. Cl.

| | |
|---|---|
| ***C11D 17/06*** | (2006.01) |
| ***B08B 3/08*** | (2006.01) |
| ***C11D 7/06*** | (2006.01) |
| ***C11D 7/26*** | (2006.01) |
| ***C11D 7/36*** | (2006.01) |
| ***C11D 11/00*** | (2006.01) |
| ***C11D 17/00*** | (2006.01) |

(52) U.S. Cl.

CPC ................ *C11D 7/265* (2013.01); *B08B 3/08* (2013.01); *C11D 7/06* (2013.01); *C11D 11/0023* (2013.01); *C11D 17/0008* (2013.01); *C11D 17/0052* (2013.01); *C11D 17/06* (2013.01)

(58) Field of Classification Search

None

See application file for complete search history.

(56) References Cited

U.S. PATENT DOCUMENTS

| | | | | |
|---|---|---|---|---|
| 5,080,819 | A | 1/1992 | Morganson et al. | |
| 5,759,976 | A | 6/1998 | Roach et al. | |
| 5,876,514 | A | 3/1999 | Rolando et al. | |
| 7,858,574 | B2 | 12/2010 | Smith et al. | |
| 7,964,544 | B2 | 6/2011 | Smith et al. | |
| 8,287,658 | B2 | 10/2012 | Miralles et al. | |
| 8,536,106 | B2 | 9/2013 | Miralles | |
| 8,809,249 | B2 | 8/2014 | Silvernail et al. | |
| 8,906,839 | B2 | 12/2014 | Lentsch et al. | |
| 9,090,857 | B2 | 7/2015 | Silvernail et al. | |
| 9,102,905 | B2 | 8/2015 | Walters et al. | |
| 9,677,031 | B2 | 6/2017 | Cabanas et al. | |
| 11,441,107 | B2 * | 9/2022 | Hammel | C11D 7/5004 |
| 2006/0025325 | A1 | 2/2006 | Ryther | |
| 2011/0021403 | A1 | 1/2011 | Miralles et al. | |
| 2011/0160114 | A1 | 6/2011 | Smith et al. | |
| 2011/0269662 | A1 | 11/2011 | Miralles | |
| 2012/0329700 | A1 | 12/2012 | Silvernail et al. | |
| 2013/0123164 | A1 | 5/2013 | Jones et al. | |
| 2014/0069466 | A1 | 3/2014 | Silvernail et al. | |
| 2014/0121150 | A1 * | 5/2014 | Walters | C11D 3/3757 510/469 |
| 2014/0256611 | A1 | 9/2014 | Silvernail et al. | |
| 2014/0336097 | A1 * | 11/2014 | Walters | C11D 3/365 510/469 |
| 2015/0038390 | A1 | 2/2015 | Silvernail et al. | |
| 2017/0107314 | A1 | 4/2017 | Olson et al. | |
| 2018/0251708 | A1 | 9/2018 | Silvernail et al. | |
| 2018/0312779 | A1 | 11/2018 | Hodge et al. | |
| 2018/0320110 | A1 | 11/2018 | Dotzauer et al. | |
| 2018/0334640 | A1 | 11/2018 | Bartelme et al. | |

FOREIGN PATENT DOCUMENTS

| | | | |
|---|---|---|---|
| DE | 4213036 | A1 | 10/1993 |
| WO | 2013160093 | A1 | 10/2013 |

OTHER PUBLICATIONS

Ecolab USA Inc., "The International Search Report and the Written Opinion of the International Searching Authority, or the Declaration", in connection with PCT/2019/038896 filed Jun. 25, 2019, 17 pages, dated Oct. 25, 2019.

McDonnel et al., "An Improved Method for Evaluating Detergent Builders for Water Hardness Control", JAOCS, vol. 64. No. 5, pp. 769-776, May 1987.

* cited by examiner

*Primary Examiner* — Lorna M Douyon

(74) *Attorney, Agent, or Firm* — McKee, Voorhees & Sease, PLC

(57) ABSTRACT

Powder and cast solid alkaline cleaning compositions are disclosed. Powders and/or solidification of a highly alkaline detergent composition are provided including sodium hydroxide beads and/or liquid and sodium carbonate in combination with water conditioning polymers. Methods of cleaning for soil removal of baked on, greasy soils, including those found in ovens, are also disclosed.

20 Claims, 2 Drawing Sheets

POWDER AND SOLID ALKALINE CLEANING COMPOSITIONS AND USE THEREOF FOR REMOVING GREASY SOILS

CROSS-REFERENCE TO RELATED APPLICATIONS

This application is a Continuation Applications of U.S. Ser. No. 16/451,790, filed Jun. 25, 2019, now U.S. Pat. No. 11,441,107, which application claims priority to Provisional application U.S. Ser. No. 62/689,906, filed on Jun. 26, 2018, which are herein incorporated by reference in their entirety.

FIELD OF THE INVENTION

The invention relates generally to the field of solidification and providing powder or cast solid alkaline cleaning compositions. The present invention relates to powder and/or solidification of a highly alkaline detergent composition providing at least equivalent or improved performance over concentrated ready-to-use liquids, in addition to overcoming difficulty of product stability for ongoing dissolution into use solutions for effective cleaning. In particular, the present invention relates to an alkaline detergent composition including sodium hydroxide beads and/or liquid, and in some embodiments sodium carbonate, in combination with water conditioning polymers, namely polycarboxylic acid polymers. The compositions of the invention beneficially provide cleaning efficacy for soil removal of baked on, greasy soils, including those found in ovens.

BACKGROUND OF THE INVENTION

Aqueous cleaning compositions have commonly been used in most cleaning applications. Most liquid materials even in a concentrate form contain substantial amounts of water which can be difficult to manufacture, transport and sell. Although many liquid formulations have had commercial success, however, a substantial need in this art exists to manufacture an easy to use concentrate having minimal water and a high actives concentration to provide excellent soil, e.g. grease, removal properties.

Solid formulations including cast blocks have unique advantages over conventional liquids, granules, or pellet forms of cleaning compositions, including improved handling, enhanced safety, and elimination of component segregation during transportation and storage, and increased concentrations of active components within the composition. Because of these advantages, solid blocks are widely used, especially by commercial and institutional entities that routinely use large quantities of cleaning materials. Various compositions and methods to produce solid detergent blocks are known. Regardless of the methods of making solid blocks, there is a need to provide highly concentrated alkaline solids that provide at least equivalent cleaning efficacy as liquid products. However, it has been shown that highly caustic powders for solidification fail to consistently form stable compositions presenting a formulation challenge. Accordingly, it is an objective to develop a solid cast composition for highly alkaline cleaning, including ovens and other surfaces with baked on and/or greasy soils.

In addition, powder formulations have unique advantages over conventional liquid forms of cleaning compositions, including enhanced safety and dosing. However, flowable powders are difficult to formulate. Many components are hygroscopic in nature and will result in formulations that absorb water and lead to clumping. Accordingly, another object is to develop a flowable powder composition for highly alkaline cleaning, including ovens and other surfaces with baked on and/or greasy soils. The flowable powders enable easy dosing into a hard surface for treatment, such as pouring into an application oven for cleaning.

There is also a desire to provide cleaning compositions without phosphates. The phosphates typically serve multiple purposes in cleaning compositions, including for example, to control the rate of solidification, to remove and suspend soils, and as an effective hardness sequestrant. However, due to ecological concerns, further work has recently been directed to replacing phosphorous-containing compounds. In addition, nitrilotriacetic acid (NTA)-containing aminocarboxylate components used in place of phosphorous-containing compounds in some instances as a binding agents and hardness sequestrants, are believed to be carcinogenic. As such, their use has also been curtailed. Accordingly, another object is to develop flowable powder compositions and solid cast compositions that do not contain phosphonates.

In a further aspect, the compositions and methods of using the compositions provide physically stable compositions, including flowable powder and stable solids, having durable cleaning performance, including for example in cleaning ovens.

Other objects, advantages and features will become apparent from the following specification taken in conjunction with the accompanying examples, figures, and drawings.

BRIEF SUMMARY OF THE INVENTION

An advantage of the compositions and methods of using the compositions is that a highly alkaline solid, including cast solid and powder, composition provides at least substantially similar or equivalent cleaning of soiled hard surfaces, such as ovens.

In one embodiment, a powder alkaline cleaning composition comprises an alkali metal hydroxide alkalinity source; an alkali metal carbonate alkalinity source; at least one polyacrylic acid polymer or salt or derivative thereof and a processing aid, wherein the composition is a free-flowing powder that does not clump.

In another embodiment, a solid alkaline cleaning composition comprises at least one alkali metal hydroxide alkalinity source; at least one polyacrylic acid polymer or salt or derivative thereof and a processing aid.

In yet another embodiment, methods of cleaning by applying a surface either of the powder or cast solid compositions is provided. In some embodiments, the methods do not require the use of surfactants, chelants or other additional functional ingredients commonly formulated into alkaline detergent compositions. Beneficially, the methods of cleaning achieve near or complete (i.e. 100%) soil removal through the use of alkalinity and polyacrylic acid polymers or salts or derivatives thereof.

While multiple embodiments are disclosed, still other embodiments of the present invention will become apparent to those skilled in the art from the following detailed description, which shows and describes illustrative embodiments of the invention. Accordingly, the examples, figures, drawings, and detailed description are to be regarded as illustrative in nature and not restrictive.

Figure 1:
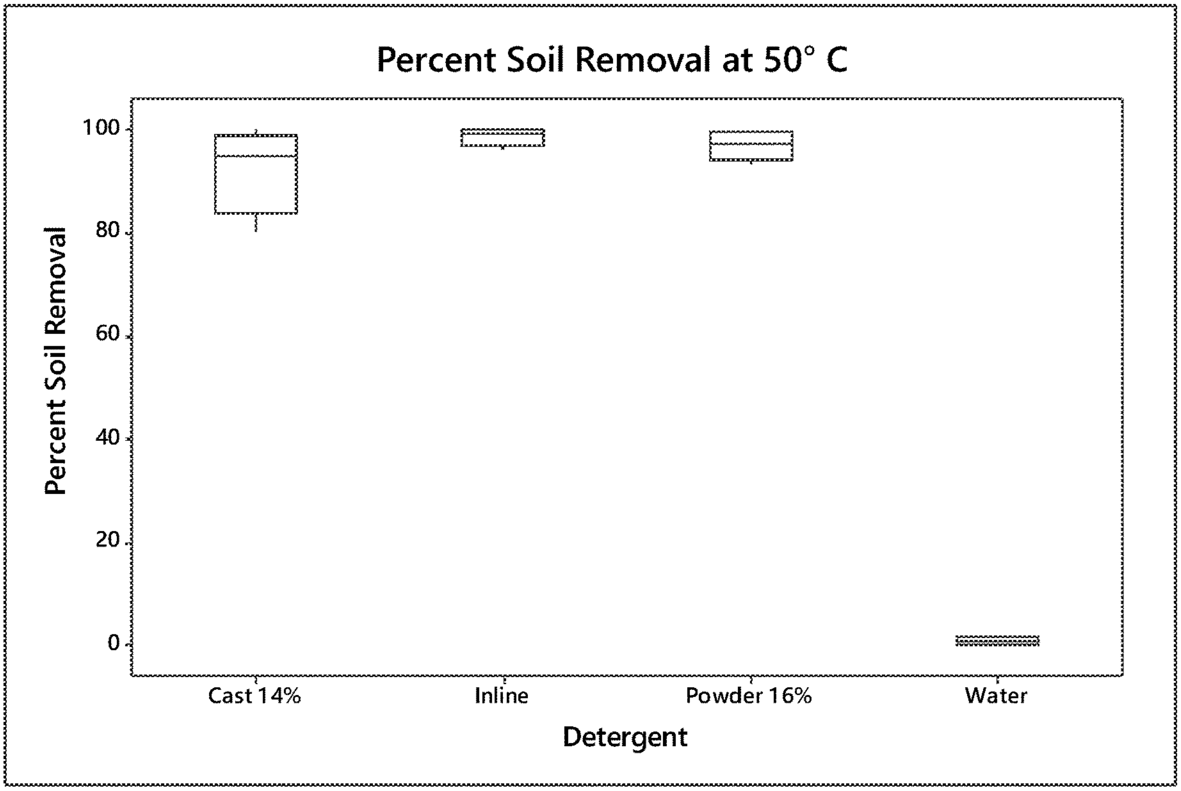
FIG. 1 shows a boxplot of the percent soil removal comparing a liquid inline alkaline cleaning composition in comparison to powder and cast solid compositions evaluated herein.

Various embodiments of the present invention will be described in detail with reference to the examples, figures, and drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

Flowable powder and solid cast compositions providing highly alkaline cleaning compositions are provided. The compositions provide substantially similar cleaning performance as conventional liquid products while overcoming formulation challenges. The solid highly alkaline detergent compositions provide at least equivalent or improved performance over concentrated ready-to-use liquids while overcoming difficulty of product stability for ongoing dissolution into use solutions for effective cleaning. It is surprising that the solids are able to replace liquid compositions in light of the long cycle time required for the products and stability challenges for the solid to dissolve into the use solution and provide effective cleaning. In addition, the solid compositions eliminate the need for dispensing equipment to simply a user's dosing and application of the cleaning composition. The embodiments of this invention are not limited to particular compositions and methods of use, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5). In addition, without being limited according to the invention, all ranges recited are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "cleaning" refers to perform, facilitate, or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

The terms "dimensional stability" and "dimensionally stable" as used herein, refer to a solid product having a growth exponent of less than about 3%. If the solid product swells after solidification, various problems may occur, including but not limited to decreased density, integrity, and appearance; and inability to dispense or package the solid product. Generally, a solid product is considered to have dimensional stability if the solid product has a growth exponent of less than about 3%. Growth exponent refers to the percent growth or swelling of a product over a period of time after solidification under normal transport/storage conditions. Because normal transport/storage conditions for detergent products often results in the detergent composition being subjected to an elevated temperature, the growth exponent of a solid detergent product may be determined by measuring one or more dimensions of the product prior to and after heating at between about 100° F. and 122° F. The measured dimension or dimensions depends on the shape of the solid product and the manner in which it swells. For tablets, the change in both diameter and height is generally measured and added together to determine the growth exponent. For capsules, just the diameter is normally measured.

The term "hard surface" refers to a solid, substantially non-flexible surface such as a countertop, tile, floor, wall, panel, window, plumbing fixture, kitchen and bathroom furniture, appliance, engine, circuit board, and dish. Hard surfaces may include for example, food processing surfaces. As used herein, the phrase "food processing surface" refers to an oven, including combination oven, boiler, surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule. For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions described herein may comprise, consist essentially of, or consist of the steps, components and ingredients as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Cleaning Compositions

The solid cleaning compositions include flowable powders and solid cast blocks. The solid cleaning compositions may be free of phosphorous and NTA, making the cleaning compositions particularly useful in cleaning applications where it is desired to use an environmentally friendly, solid alkaline detergent. Phosphorus-free means a solid composition having less than approximately 0.5 wt-%, less than approximately 0.1 wt-%, less than approximately 0.01 wt-%, and even more particularly 0 wt-% phosphorous. NTA-free means a solid composition having less than approximately 0.5 wt-%, less than approximately 0.1 wt-%, than approximately 0.01 wt-%, and even more particularly 0 wt-% NTA.

Powder Compositions

In an aspect, the flowable powder cleaning compositions comprise, consist of or consist essentially of an alkali metal hydroxide alkalinity source; an alkali metal carbonate alkalinity source; at least one polycarboxylic acid polymer or salt or derivative thereof; and a processing aid, wherein the composition is a free-flowing powder that does not clump.

Exemplary ranges of the flowable powder compositions are shown in Table 1 in weight percentage of the solid cleaning composition.

TABLE 1

| Material | First Exemplary Range wt-% | Second Exemplary Range wt-% | Third Exemplary Range wt-% | Fourth Exemplary Range wt-% |
|---|---|---|---|---|
| Hydroxide Alkalinity Source | 40-80 | 40-70 | 45-70 | 50-70 |
| Carbonate Alkalinity Source | 20-60 | 20-50 | 20-45 | 25-40 |
| Polycarboxylic Acid Polymer | 5-25 | 5-20 | 5-15 | 7.5-15 |
| Processing Aid | 0.1-10 | 0.1-5 | 0.5-5 | 0.5-2 |
| Additional Functional Ingredients | 0-50 | 0.1-50 | 1-40 | 1-25 |

Solid Block Compositions

In an aspect, the solid cast block cleaning compositions comprise, consist of or consist essentially of at least one alkali metal hydroxide alkalinity source; at least one polycarboxylic acid polymer or salt or derivative thereof; and a processing aid. In preferred embodiments, a combination of hydroxide alkalinity sources and a combination of polycarboxylic acid polymer or salt or derivative thereof, along with a processing aid provide uniform compositions having a viscosity between 2800-4000 mPas before casting the solid composition.

Exemplary ranges of the solid block compositions are shown in Table 2 in weight percentage of the solid cleaning composition.

TABLE 2

| Material | First Exemplary Range wt-% | Second Exemplary Range wt-% | Third Exemplary Range wt-% | Fourth Exemplary Range wt-% |
|---|---|---|---|---|
| Hydroxide Alkalinity Source | 50-95 | 60-95 | 60-90 | 65-85 |
| Polycarboxylic Acid Polymer | 5-50 | 5-40 | 10-40 | 10-30 |
| Processing Aid | 0.001-5 | 0.01-2.5 | 0.05-2.5 | 0.05-1 |
| Additional Functional Ingredients | 0-50 | 0-40 | 0-30 | 0-25 |

Sources of Alkalinity

The solid compositions include an effective amount of at least one alkalinity source. In general, an effective amount of the alkaline source should be considered as an amount that provides a use solution having a pH of at least about 12. When the use solution has a pH of between about 12-14 the use solution can be considered caustic. In general, it is desirable to provide the use solution as a highly alkaline cleaning composition having a pH above 10, above 11, above 12, above 13, or preferably from about 12 to about 14, or from about 12 to about 14.

The alkalinity source can include an alkali metal carbonate, an alkali metal hydroxide, or a mixture thereof. Suitable alkali metal carbonates that can be used include, for example, the hydratable salts sodium or potassium carbonate, bicarbonate, sesquicarbonate, or a mixture thereof. Suitable alkali metal hydroxides that can be used include, for example, sodium, lithium, or potassium hydroxide.

The alkaline source can be added to the composition in the form of solid. For example, alkali metal hydroxides are commercially available as a solid in the form of prilled solids or beads having a mix of particle sizes ranging from 25 about 12-100 U.S. mesh. For example, an alkali metal hydroxide may be added to the solid composition in a variety of solid forms, including for example in the form of solid beads. The alkaline source can also be added in the form of a liquid, including an aqueous liquid.

The solid cleaning compositions can include one or more alkalinity sources. In some aspects, two alkalinity sources are employed, wherein one source is a liquid and one source is a solid. In further aspects, two or more alkalinity sources are employed, wherein one or more source is a liquid and one or more source is a solid. In some embodiments the multiple alkalinity sources can be an alkali metal carbonate, an alkali metal hydroxide, or a mixture thereof.

In a preferred embodiment, the alkali metal hydroxide comprises sodium hydroxide, and the alkali metal carbonate comprises sodium carbonate.

In powder compositions, an alkali metal hydroxide alkalinity source is provided as a solid source, such as sodium hydroxide beads. In powder compositions, an alkali metal carbonate alkalinity source is also provided as a solid source, such as sodium carbonate powder. In such exemplary embodiments, the powder composition can include between about 40 wt-% and about 80 wt-%, between about 40 wt-% and about 70 wt-%, between about 45 wt-% and about 70 wt-%, or between about 50 wt-% and about 70 wt-% of the hydroxide alkalinity source, and between about 20 wt-% and about 60 wt-%, between about 20 wt-% and about 50 wt-%, between about 20 wt-% and about 45 wt-%, or between about 25 wt-% and about 40 wt-% of the carbonate alkalinity source.

In solid cast block compositions, at least one alkali metal hydroxide alkalinity source is provided, such as sodium hydroxide. In such exemplary embodiments, the solid block composition can include between about 50 wt-% and about 95 wt-%, between about 60 wt-% and about 95 wt-%, between about 60 wt-% and about 90 wt-%, or between about 65 wt-% and about 90 wt-% of the hydroxide alkalinity sources. In some embodiments In some embodiments of the solid cast block compositions, two alkali metal hydroxide alkalinity sources are included in the solid compositions, wherein a first alkali metal hydroxide alkalinity source is a liquid and a second alkali metal hydroxide alkalinity source is a solid (e.g. beads). A preferred ratio of the first liquid alkali metal hydroxide alkalinity source to the second solid alkali metal hydroxide alkalinity source is from about 1:2 to about 1:9, from about 1:2 to about 1:6, from about 1:3 to about 1:6, or from about 1:3 to about 1:5. Without being limited to a particular mechanism of action, the preferred ratio of the first liquid alkali metal hydroxide alkalinity source to the second solid alkali metal hydroxide alkalinity source provides efficacious neutralization of the polycarboxylic acid polymers, reaction temperature and viscosity throughout the solidification of the compositions.

In some embodiments of the solid block compositions having two alkali metal hydroxide sources, the composition includes between about 5 wt-% and about 25 wt-% of a first liquid alkali metal hydroxide alkalinity source and between about 40 wt-% and about 90 wt-% of a second solid alkali metal hydroxide alkalinity source. In further embodiments the composition includes between about 10 wt-% and about 20 wt-% of a first liquid alkali metal hydroxide alkalinity source and between about 50 wt-% and about 80 wt-% of a second solid alkali metal hydroxide alkalinity source. In still further embodiments the composition includes between about 15 wt-% and about 20 wt-% of a first liquid alkali metal hydroxide alkalinity source and between about 60 wt-% and about 80 wt-% of a second solid alkali metal hydroxide alkalinity source.

Polycarboxylic Acid Polymers

The solid compositions include an effective amount of at least one polycarboxylic acid polymer or salt or derivative thereof. As referred to herein, the reference to any polycarboxylic acid polymer shall further encompass the salt or derivative thereof as also being a suitable polymer for use in the solid cleaning compositions. Examples of particularly suitable polycarboxylic acid polymers include, but are not limited to: polyacrylic acid polymers, polyacrylic acid polymers modified by a fatty acid end group ("modified polyacrylic acid polymers"), polymaleic acid polymers and combinations of these polymer materials. Salts of each of the polycarboxylic acid polymers may further be employed for the solid alkaline detergent compositions.

As referred to herein the polycarboxylic acid polymers or salts or derivatives thereof are not surfactants for the solid compositions. In an embodiment, the solid compositions do not include surfactants while providing efficacious solid stability for the composition and efficacious cleaning.

Non-limiting examples of polycarboxylic acid polymer salts include polyacrylic acid salts and derivatives, such as water soluble acrylic polymers. Such polymers include, but are not limited to, polyacrylic acid, polymethacrylic acid, acrylic acid, acrylic acid-methacrylic acid copolymers, polymaleic acid, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, and the like, or combinations thereof or copolymers thereof. Water soluble salts or partial salts of these polymers such as their respective alkali metal (e.g., sodium, potassium, or combinations thereof) or ammonium salts can also be used.

An example of particularly suitable commercially available polyacrylic acid polymer and salts and derivatives thereof includes, but is not limited to, Acusol 445ND, available from Rohm & Haas LLC, Philadelphia, Pa. An example of particularly suitable commercially available modified polyacrylic acid polymer includes, but is not limited to, Alcosperse 325, available from Alco Chemical, Chattanooga, Tenn. Examples of particularly suitable commercially available polymaleic acid polymers include, but are not limited to: Belclene 200, available from Houghton Chemical Corporation, Boston, Mass. and Aquatreat AR-801, available from Alco Chemical, Chattanooga, Tenn.

Examples of particularly suitable polyacrylic acid polymers and modified polyacrylic acid polymers and salts and derivatives thereof, include those having a molecular weight of between about 1,000 and about 100,000 g/mol, preferably between about 1,000 and about 25,000 g/mol. In alternative embodiments, the solid compositions may include at least two polyacrylic acid polymers having different molecular weights.

Phosphonocarboxylic acid copolymer or phosphonopolyacrylic acid homopolymer having the following structure are also suitable polycarboxylic acid polymers:

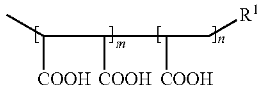

wherein $R_1$ is a phosphino (—PH(═O)(OH)) or phosphono (—P(═O)$(OH)_2$) end group. The molecular weight is from about 1,000 to about 50,000 g/mol, and the ratio of m:n is from about 1:50 to about 2:5. In an embodiment the phosphino or phosphono end group comprises from about 0.1 wt % to about 12 wt % of the polycarboxylic acid copolymer. In certain aspects $R_1$ is $PO_2H_2$ or $PO_3H_2$. In additional aspects, m is an integer of 0 or larger, and n is an integer of 2 or larger. The value of the maleic group (m) of the phosphonocarboxylic acid copolymer or phosphonopolyacrylic acid homopolymer may be zero for the homopolymer. The value of the acrylic group (n) of the phosphonocarboxylic acid copolymer or phosphonopolyacrylic acid homopolymer may be at least 2. In an aspect of the invention for the copolymer, the sum of m+n is between about 5 to 180, wherein the molecular weight range of the polymer is between about 1,000 and 50,000.

As used herein, the term "phosphono end group" refers to a phosphono functional group according to the formula:

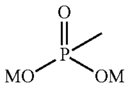

wherein each M is independently H or a cation, preferably both Ms are H.

Any reference to phosphonocarboxylic acid copolymers or phosphonopolyacrylic acid homopolymers shall be understood to equally incorporate and include any phosphonocarboxylic acid copolymers or phosphonopolyacrylic acid homopolymers set forth by the above formula. In some embodiments, polyacrylic phosphono end group polymers or acrylic-maleic phosphono end group copolymers have the following general formula (as depicted above): $H_2PO_3$—$(CH_2$—CHCOOH)n(CHCOOH—CHCOOH)m. In some aspects n is an integer greater than 0, m is an integer of 0 (for polyacrylic polymers) or greater (for acrylic-maleic copolymers). For polyacrylates, m is zero. In some aspects n and m are integers independently selected to give a molecular weight of the polymer of between about 500 and 200,000 g/mol, preferably of between 500 and 100,000 g/mol, and more preferably between 1,000 and 25,000 g/mol. In some embodiments, suitable polycarboxylates with phosphono end groups are copolymers of acrylic acid and maleic acid having a phosphono end group and homopolymers of acrylic acid having a phosphono end group. An example of a preferred modified polycarboxylate is a copolymer of acrylic acid and maleic acid with a phosphonic/phosphono end group according to the following general formula:

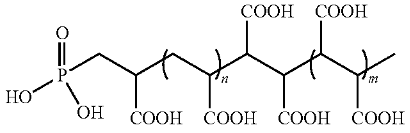

having variable molecular weights, wherein n is from about 10 mol % to 90 mol %, preferably from about 80 mol %, and wherein m is from about 10 mol % to 90 mol %, preferably from about 20 mol %.

Phosphonocarboxylic acid copolymers or phosphonopolyacrylic acid homopolymers are low-phosphorus, non-nitrogenous and environmentally friendly agents that may be synthesized as a combination of various chain-length phosphonocarboxylic acid copolymers or phosphonopolyacrylic acid homopolymers. Phosphonocarboxylic acid copolymers or phosphonopolyacrylic acid homopolymers may have various chain length polymers and therefore varying molecular weights. Examples of suitable commercially-available phosphonocarboxylic acid copolymers include Acusol 425N, available from Rohm & Haas. Acusol 425N is a low molecular weight (1900 MW) acrylic/maleic (ratio 80/20) copolymer having a phosphono end group (approximately 1.6-1.7 wt-% phosphorus) and has an activity of 50%. In some embodiments, a low molecular weight phosphonocarboxylic acid copolymer is preferred, such as polymers having molecular weight below about 2,000 grams/mole.

The polymers, including the phosphorus end group may be present fully or partly in the neutralized form. In some aspects the phosphonocarboxylic acid copolymers or phosphonopolyacrylic acid homopolymers are neutralized.

In some embodiments of the powder compositions have at least one polycarboxylic acid polymer or salt or derivative thereof, or preferably at least two polycarboxylic acid polymer or salt or derivative thereof, in amounts between about 5 wt-% and about 25 wt-%, between about 5 wt-% and about 20 wt-%, between about 5 wt-% and about 15 wt-%, or between about 7.5 wt-% and about 15 wt-% of the powder composition. In some embodiments, the powder compositions comprise one polycarboxylic acid polymer or salt or derivative thereof containing a phosphorus end group and one polycarboxylic acid polymer or salt or derivative thereof without a phosphorus containing end group.

In some embodiments of the solid block compositions have at least one polycarboxylic acid polymer or salt or derivative thereof, or preferably at least two polycarboxylic acid polymer or salt or derivative thereof, in amounts between about 5 wt-% and about 50 wt-%, between about 5 wt-% and about 40 wt-%, between about 10 wt-% and about 40 wt-%, or between about 10 wt-% and about 30 wt-% of the solid block composition. In some embodiments, the solid compositions comprise one polycarboxylic acid polymer or salt or derivative thereof containing a phosphorus end group and one polycarboxylic acid polymer or salt or derivative thereof without a phosphorus containing end group. In some embodiments, the solid compositions contain one polycarboxylic acid polymer or salt or derivative thereof that is a solid and a second polycarboxylic acid polymer or salt or derivative thereof that is a liquid. In further preferred embodiments, the solid compositions contain one polycarboxylic acid polymer or salt or derivative thereof that is a low molecular weight copolymer (molecular weight less than 2,000 g/mol) and has a phosphono end group and a second polycarboxylic acid polymer or salt or derivative thereof that does not have a phosphono end group and having a distinct molecular weight between about 1,000 and about 25,000 g/mol, preferably between about 2,500 g/mol and about 5,000 g/mol). As referred to herein, a distinct molecular weight refers to a different molecular weight from the first polycarboxylic acid polymer or salt or derivative thereof Processing Aids The powder solid compositions include an effective amount of a processing aid. Suitable processing aids to provide flowable powder compositions and/or reducing aeration of cast solid compositions include organic solvents. Exemplary organic solvent processing aids comprises methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, hexylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or any combination thereof. In a preferred embodiment, propylene glycol is the processing aid for powder solid compositions. In a preferred embodiment, hexylene glycol is the processing aid for powder solid compositions.

In some embodiments of the powder compositions have a processing aid present in the amount of between about 0.1 wt-% and about 10 wt-%, between about 0.1 wt-% and about 5 wt-%, between about 0.5 wt-% and about 5 wt-%, or between about 0.5 wt-% and about 2 wt-% of the powder composition.

In some embodiments of the solid cast compositions have a processing aid present in the amount of between about 0.001 wt-% and about 5 wt-%, between about 0.01 wt-% and about 2.5 wt-%, or between about 0.05 wt-% and about 1 wt-%.

Water

According to aspects of the solid compositions, water is preferably not added to the solid compositions. Instead, water may be provided as a result of its presence in an aqueous material that is added to the solid composition. The amount of water in the resulting solid detergent composition will depend on the methods of forming employed for the solid composition (e.g. processing forming techniques). As the methods and compositions prefer use in casting (i.e. solidification occurring within a container) a greater amount of aqueous or water content can be employed. For example, when preparing the solid cleaning composition by forming techniques, water may be present in ranges of between about 1% and about 25% by weight, particularly between about 1% and about 20% by weight, and more particularly between about 2% and about 10% by weight.

Additional Functional Ingredients

In some embodiments, the cleaning compositions optionally contain additional functional ingredients. These ingredients can be in solid form and/or liquid form and used to form the solid compositions. In some embodiments, the alkalinity source(s), polycarboxylic acid polymer or salt or derivative thereof, and processing aid make up a large amount, or even substantially all of the total weight of the solid compositions, for example, in embodiments having few or no additional functional ingredients disposed therein. In a preferred embodiment, the solid compositions are free of surfactants, chelants and/or additional cleaning agents.

In other embodiments, additional functional ingredients make up some amount of the total weight of the solid compositions. The optional functional ingredients provide desired properties and functionalities to the cleaning compositions. For the purpose of this application, the term "functional ingredients" includes an ingredient that when dispersed or dissolved in a use and/or concentrate, such as an aqueous solution, provides a beneficial property in a particular use. Some particular examples of functional ingredients are discussed in more detail below, although the particular materials discussed are given by way of example only, and that a broad variety of other functional ingredients may be used. For example, many of the functional ingredients discussed below relate to materials used in cleaning applications. However, other embodiments may include functional ingredients for use in other applications.

Exemplary additional functional ingredients include for example: surfactants (nonionic surfactant, anionic surfactant, cationic surfactant, amphoteric surfactant, zwitterionic surfactant); chelants; builders or water conditioners; bleaching agents; flow aids; threshold agents; crystal modifiers; hardening agents; bleaching agents; fillers; defoaming agents; anti-redeposition agents; stabilizing agents; dispersants; enzymes; corrosion inhibitors; fragrances and dyes; thickeners; etc. Disclosure of suitable surfactants is set forth for example in "Surfactant Encyclopedia", *Cosmetics & Toiletries*, Vol. 104 (2) 69-96 (1989); *Nonionic Surfactants*, edited by Schick, M. J., Vol. 1 of the Surfactant Science Series, Marcel Dekker, Inc., New York, 1983; Surface Active Agents and detergents (Vol. I and II by Schwartz, Perry and Berch) and the like which are hereby incorporated by reference in their entirety. Additional description of suitable additional functional ingredients is set forth in U.S. application Ser. No. 13/734,204, which is herein incorporated by reference in its entirety.

Examples of various flow aids that can also be included in the composition may also be referred to as carriers and/or glidants and are generally known for improving the processing of solid compositions. Suitable components for improving the flowability of the homogenous powder components according to the invention, may include for example, inorganic or organic agents. According to an aspect, inorganic agents are preferred, including for example silicas, borates, acetate salts, sulfate salts and the like. Silicas, including for example the precipitated or fumed forms can be employed and are commercially available.

Solid Compositions

As used herein, the term "solid" refers to a state of matter known to those of skill in the art. A solid may be of crystalline, amorphous form, or a mixture thereof. A solid may be a mixture of two or more different solids and/or liquid components that form a solid upon combination. A solid may be aggregates of particles. A solid may be a powder of one or more compounds. A powder is a flowable solid.

As used herein, a solid composition, a powder composition, and/or solid alkaline cleaning composition refers to a cleaning composition in the form of a solid such as a powder composition and/or solid blocks. Solids are also understood to include forms including a flake, a granule, a pellet, a tablet, a lozenge, a puck, a briquette, a brick, or another solid form known to those of skill in the art. Solid tablets, pellets and/or blocks can include pressed, cast or extruded solids.

It should be understood that the term "solid" refers to the state of the cleaning composition under the expected conditions of storage and use of the solid cleaning composition. In general, it is expected that a solid block composition will remain a solid at a temperature up to about 120° F. while retaining dimensional stability. In general, it is expected that a solid powder will remain a flowable powder at temperature up to about 120 F without clumping and/or absorbing water.

The solid cleaning compositions disclosed herein are preferably provided as a cast solid or a powder. A solid block can be provided in the form of a unit dose or a multi-use solid. A unit dose refers to a solid detergent composition unit sized so that the entire unit is used during a single washing cycle. When the solid composition is provided as a unit dose it may have a size between about 1 gram and about 50 grams. Alternatively, a solid tablet may have a size of between about 50 grams and about 250 grams. A solid block, including a multi-use block may have a weight of about 250 grams or greater. In some embodiments, the solid block has a mass of between about 250 grams and 10 kilograms, preferably between about 1 pound and about 10 pounds. According to embodiments of the invention, the solid cleaning composition is preferably a cast solid or a powder.

The solid cleaning compositions are provided to an application of use, such as an oven or other hard surface, and used to generate an aqueous cleaning composition, e.g., use solution. Typically, the solid cleaning composition as disclosed herein dissolves quickly and completely upon contact with aqueous solution into a stable use solution. A stable use solution does not contain any solids upon visual inspection.

The solid cleaning compositions may be formed using a batch or continuous mixing system. The components, including for example the alkalinity source, polycarboxylic acid polymer or salt or derivative thereof, processing aids, and optionally additional functional ingredients are blended to form a mixture, preferably a homogeneous mixture. Generally, a solid block and flowable powders are substantially homogeneous with regard to the distribution of ingredients throughout its mass and is dimensionally stable.

The cast solid cleaning compositions may be formed by employing a melt and solidification of the melt. Forming a melt requires heating a composition to melt it. The heat can be applied externally or can be produced by a chemical exotherm (e.g., from mixing caustic (sodium hydroxide) and water). Following the heating of the composition the methods of making require cooling the melt in a container to solidify the melt and form the cast solid.

The flowable powder compositions can be made by mixing the components. Beneficially, the processing aid, such as propylene glycol, is added to reduce dust from the powder formula. Additionally the ratio of alkalinity sources (e.g. ash/NaOH) and the amount of liquid in the formula from the polymers is used in order to produce a flowable powder.

Methods of Using the Solid Compositions

The solid composition is dosed into a wash cycle or dosed into a system in need of extended treatment time, such as an oven or other heavily soiled surface requiring an extended contact time with the alkaline cleaning composition. A solid composition is provided at a desired "dispense rate", referring to an amount of the solid mass provided either through a dispensing unit or preferably dosed directly into a system and subjected to water contact through the dispenser's mechanism for a certain period of time. The solid contacts water at a certain temperature and pressure to dissolve into a use solution the powder or solid block composition for cleaning applications.

A variety of dispensers are suitable for dispensing the solid cleaning compositions disclosed herein. A dispenser uses a block of a specific dimension and shape and can be configured to deliver water of a certain temperature and pressure. In preferred embodiments, a dispenser is not required for use of the solid cleaning compositions. In certain embodiments, a user doses (or provides the solid) directly into a system in need of cleaning and water at a desired temperature and pressure is applied to the solid within the system. For example, a solid cleaning composition can be inserted directly into an oven, for example through a funnel or other member, and a water pump and spray arm thereafter distribute a use solution of the cleaning composition to all surfaces of the oven in need of cleaning.

In other aspects, the solid compositions may be initially used to generate an aqueous solution or suspension for delivery to a hard surface, such as an oven, for cleaning. Thereafter, the use solutions are applied to the internal surfaces of the apparatus, such as for example, through the use of spray nozzles and/or spray jets or the like.

In either embodiment, employing a dispenser or the solid cleaning composition placed directly into a system in need of cleaning, a user controls the dispense rate of a block or powder, via the water source and how it is applied (such as through a nozzle and dispense plate) with a certain temperature and pressure. When the water contacts the solid composition it dissolves the components of the block or powder into a use solution. In exemplary applications of use, the solid compositions are contacted by water at a temperature of at least about 90° F., at least about 115° F., or at least about 140° F. may be used. A pressure of at least about 20 psi, at least about 35 psi, or at least about 50 psi for water may also be used, respectively. In preferred embodiments, the range for water temperature is typically from about 50° F. to about 160° F., and the range for water pressure from about 20 psi to about 100 psi; preferably with temperatures about 90° F. to about 140° F. and water pressures from about 20 psi to about 60 psi. Various types of water can be used. In some aspects city or municipal water with 0, 5, 17, or higher grains per gallon (gpg) is employed.

A concentrated use solution is preferably employed in the methods of cleaning. In an aspect of the invention, a use solution of the solid cleaning composition provides at least about 5% use concentration, at least about 10% use concentration, at least about 15% use concentration, at least about 20% use concentration, or between about 10% and about 20% use concentration. In some embodiments a concentrated use solution of between about 100,000 ppm and about 200,000 ppm hydroxide alkalinity. In other embodiments, a concentrated use solution of between about 100,000 ppm and about 200,000 ppm total actives.

The generated use solution from the solid compositions provides efficient removal of soils from a surface, e.g., a hard surface. In some embodiments, the method comprises contacting a use solution from the detergent blocks with a surface, and removing the composition from the surface after an amount of time sufficient to facilitate soil removal. The contacting step can last for any suitable time. In some embodiments, the contacting step lasts for at least 30 minutes, 1 hour, 2 hours, 3 hours, 4 hours, 5 hours, 6 hours, 7 hours, 8 hours, 9 hours, 10 hours, 11 hours, 12 hours, or longer.

The cleaning composition can contact the surface (or target for soil removal) in any suitable manner. In some embodiments, the cleaning composition is applied by means of a spray, a foam, soaking or the like. In preferred embodiments, the cleaning composition does not employ a dispenser. In preferred embodiments, the solid powder cleaning composition can be poured directly onto or into the hard surface (e.g. oven), and the solid block cleaning composition can be placed directly onto or into the hard surface. Thereafter, a water source, such as a hot water source, is applied to dissolve the solid cleaning composition and generate the concentrated use solution. Beneficially, the use solution provides high concentration alkalinity source for hydrolyzing the soils, namely fatty and/or greasy soils and the polycarboxylic acid polymers provide beneficial water conditioning.

The methods can be used to achieve any suitable removal of soil (e.g. cleaning), and/or reduction of the microbial population in and/or on the surface or target. The methods are beneficially effective in removing fatty and/or greasy soils found in ovens. In particular, the methods are beneficially effective in removing chicken and other animal fat soils found in ovens.

In some embodiments, the methods of cleaning further comprise draining the use solution with hydrolyzed fatty and greasy soils from the hard surface (e.g. oven). The methods of cleaning can further comprise rinsing the surface.

In some embodiments, the method further comprise a mechanical application of force, agitation and/or pressure to assist in removing the soils from the surface and/or ensuring complete contact of the surface with the use solution of the solid cleaning composition.

In some embodiments, the methods of the present invention are followed by only a rinse step. In other embodiments, the methods of the present invention are followed by a conventional CIP method suitable for the surface to be cleaned. In still yet other embodiments, the methods of the present invention are followed by a CIP method such as those described in U.S. Pat. Nos. 8,398,781 and 8,114,222 entitled “Methods for Cleaning Industrial Equipment with Pre-treatment,” both of which are hereby incorporated by reference in their entirety.

The methods can be used to remove a variety of soils from a variety of surfaces. For example, surfaces suitable for cleaning using the methods include, but are not limited to, hard surfaces, including ovens. Ovens can include self-cleaning ovens (e.g. rotisserie style) or combination ovens, such as those used in various food service industries. Various ovens are disclosed, for example, in U.S. Pat. Nos. 5,368,008, 5,640,946, and 6,410,890, EP 0652405 and DE 2842771, which are herein incorporated by references in their entirety. Additional surfaces may include fryers, smoke houses, sewer drain lines, walls, floors, ware, dishes, flatware, pots and pans, heat exchange coils, and the like. Applications requiring a presoak or an extending soak for soil removal are particularly well suited for use of the solid cleaning compositions. In a preferred embodiment, the surface to be treated is self-contained to hold a volume of the use solution and allows the soaking for an extended period of time of the use solution of the solid cleaning composition.

In an embodiment, the solid cleaning compositions provide complete soil removal from the hard surface. In an aspect, at least about 90% soil removal, at least about 95% soil removal, or 100% soil removal is achieved according to the methods employing the solid compositions.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments, in addition to those shown and described herein, will be apparent to those skilled in the art from the foregoing description. Such modifications are also intended to fall within the scope of the appended claims.

The following materials are used in the Examples:

Acusol™ 425N-45% active polyacrylic acid 1,900 g/mol MW

Acusol™ 445N-45% active polyacrylic acid 4,500 g/mol MW

Acusol™ 445ND—sodium polyacrylate

Dense Ash—Sodium Carbonate

NaOH bead—Sodium hydroxide beads (solid)

NaOH 50%—Sodium hydroxide (liquid)

KOH 50%—Potassium hydroxide (liquid)

Propylene glycol

ATMP, 50%—phosphonate; aminotris(methylenephosphonic acid) (liquid)

HEDP, 60%—phosphonate; 1-Hydroxy Ethylidene-1,1-Diphosphonic Acid (liquid)

Example 1

The formulations shown in Table 3 were evaluated for ability to provide at least substantially similar cleaning performance in comparison to a liquid inline alkaline cleaning composition. The inline composition includes a potassium hydroxide alkalinity source and phosphonate water conditioning agent/scale inhibitor.

The testing was completed on an equal hydroxide basis as shown in FIG. 1. This means the products were dosed at equal active alkalinity, which is a measure to normalize the alkaline contribution of different materials. The dosing of the hydroxide alkalinity was based on the non-diluted application rate of the liquid composition which is a concentrate liquid product.

TABLE 3

| Material (wt %) | Powder | Cast | Liquid |
|---|---|---|---|
| Water | 0.00 | 0.00 | 65.80 |
| NaOH, 50% | 0.00 | 10.00 | 0.34 |
| KOH, 45% | 0.00 | 0.00 | 33.50 |
| Acusol 425N | 5.75 | 5.00 | 0.00 |
| NaOH bead | 58.36 | 73.00 | 0.00 |
| Acusol 445N, 45% | 0.00 | 12.00 | 0.00 |
| Acusol 445ND | 5.78 | 0.00 | 0.00 |
| Propylene Glycol | 1.00 | 0.00 | 0.00 |
| Dense Ash | 29.11 | 0.00 | 0.00 |
| ATMP, 50% | 0.00 | 0.00 | 0.16 |
| HEDP, 60% | 0.00 | 0.00 | 0.20 |

Soil removal was determined using the following soak test method.

Coupon Preparation: Obtain 3"×5" 304 stainless steel coupons. On each coupon apply 0.5 g of melted chicken fat with a foam brush. Concentrate soil on the lower two-thirds of the substrate. Place coupons on a baking sheet and bake in an oven at 375° F. for 90 minutes. The baked on soil covers the coupon surface uniformly and appears dark amber in color.

Solution Preparation and Testing: Heat a constant temperature water bath to 50° C. Using 800 mL beakers prepare 500 g test solutions of the desired chemistry with 5 grains per gallon (gpg) water. Heat test solutions in water bath until temperature equilibrium is reached. Place soiled coupons in solutions and soak without mixing for 30 minutes. Remove coupons and let dry overnight.

Coupon Analysis: Scan coupons on flatbed scanner with desired settings. Analyze images using image analysis software (ImageJ or similar) to determine percent area of test space soiled. Convert percent area soiled to percent area cleaned as desired. The desired outcome of the testing is to show substantially complete or 100% soil removal.

The results of the test are shown in FIG. 1 where the percentage of soil removal was compared between the Cast solid, Inline (liquid), and Powder was compared to a negative control of water. As shown, the negative control of water does not provide any soil removal. The inline liquid formulation shows a 100% soil removal and the evaluated solid compositions beneficially provide substantially similar cleaning performance and approximate 100% soil removal.

Example 2

Further evaluation of powder formulations were conducted to assess the flowability of the solid without issues associated with 'dustiness' of the powders. The formulations in Table 4 were analyzed according to bulk flow energy, aeration (flow energy) and particle size distribution.

TABLE 4

| Formula # | 1 | 2 | 3 | 4 | 5 |
|---|---|---|---|---|---|
| Dense Ash | 30.11 | 20.11 | 29.11 | 25.86 | 27.11 |
| Acusol 425N | 5.75 | 5.75 | 5.75 | 10 | 5.75 |
| NaOH | 58.36 | 68.36 | 58.36 | 58.36 | 48.36 |
| Acusol 445ND | 5.78 | 5.78 | 5.78 | 5.78 | 5.78 |
| Propylene Glycol | 0 | 0 | 1 | 0 | 3 |

Stability and Variable Flow Rate Test: The Stability test involves measuring the flow energy after multiple conditioning steps to determine if the powder is consolidating or breaking down during processing. The variable flow rate test involves measuring the flow energy at varying flow speed to determine how sensitive the material's flow properties to changes in flow rates. These tests indicate how the material will flow after multiple processing/handling steps and through variation in flow rate from equipment and/or operator variation.

The testing confirmed that Formulas 1 and 2 had the lowest bulk flow energy profiles indicating that they are less resistant to flow and potentially dustier than the Control formula. The Control tested is a commercially-available alkaline powder for deep cleaning/processing of industrial dish machines; the Control is highly alkaline and contains high levels of chelant and other materials to help remove built on soils etc.

Formulas 3-4 all have increased liquid additions and also had higher bulk flow energies, indicating they are more resistant to flow and potentially less dusty than the Control formula.

Aeration Test: The aeration test involves measuring the flow energy while varying air velocity through the bottom of the powder. This can provide insight into the air velocity required to fluidize the powder and is an indicator of products that will be dusty when poured. The results showed that Formulas 1 and 2 had the lowest aeration energy profiles out of the Formulas 1-5 tested, indicating that they are less resistant to flow. The Control had the lowest aeration energy of all the formulations indicating that it was the least resistant to flow when aerated. A visual observation made in the testing is that the Control was the dustiest.

Formulas 3-5 all have increased liquid additions and had higher aeration energies than the Control indicating they are more resistant to flow and less "dusty".

Particle size analysis: The Control had the largest % of fine particles below 100 microns, indicating that it may be the "dustiest." Formulation 2 is low in fines despite having a normal liquid addition. This data alongside the other conclusions indicates most of the fine particles are coming from Dense Ash. The liquid addition in Formulations 3-5 reduced the fine particles.

Example 3

Additional soil removal efficacy testing was conducted for the formulations shown in Table 5 in comparison to water (negative Control).

TABLE 5

| Material (wt %) | Cast | Inline | Test |
|---|---|---|---|
| Water | 0.00 | 65.80 | 0.00 |
| NaOH, 50% | 20.0 | 0.34 | 19.9 |
| KOH, 45% | 0.00 | 33.50 | 0.00 |
| Acusol 425N | 8.0 | 0.00 | 7.9 |
| NaOH bead | 68.0 | 0.00 | 67.9 |
| Acusol 445N, 45% | 4.0 | 0.00 | 3.9 |
| Processing Aid | 0.00 | 0.00 | 0.05 |
| ATMP, 50% | 0.00 | 0.16 | 0.00 |
| HEDP, 60% | 0.00 | 0.20 | 0.00 |

Figure 2:
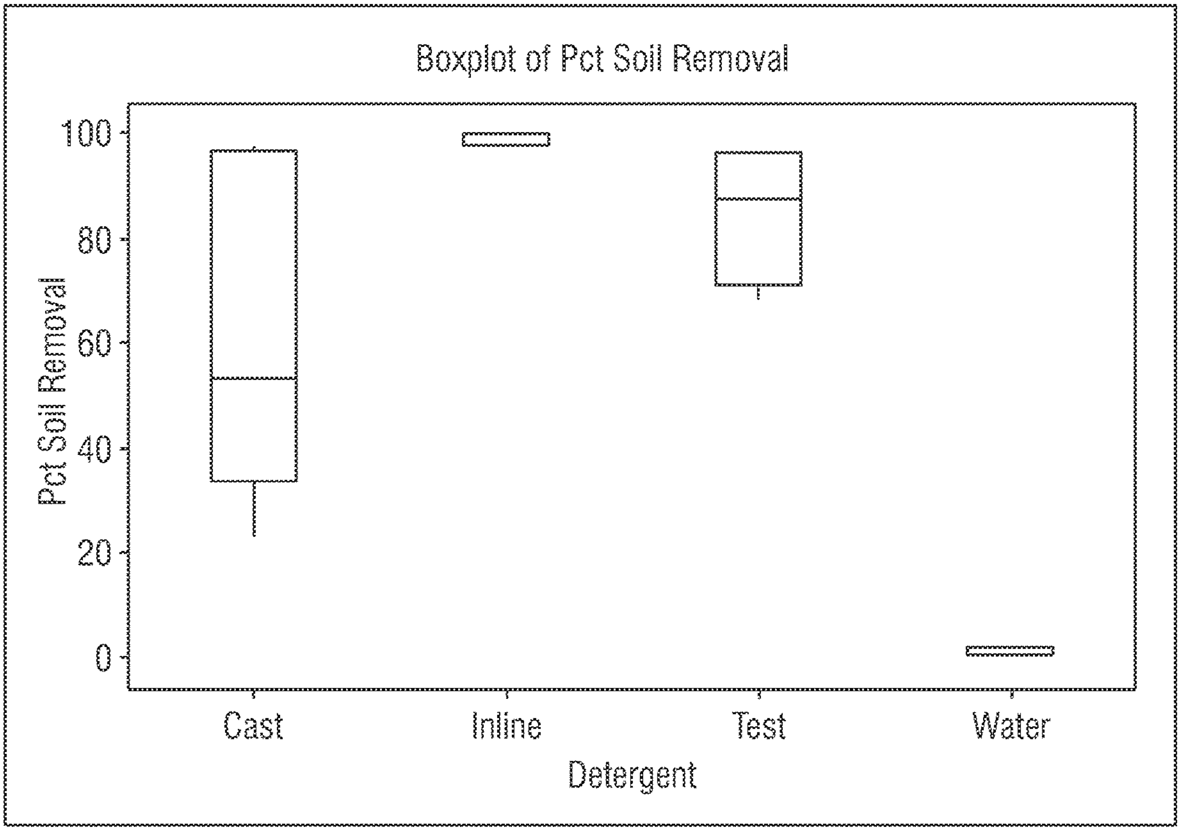
FIG. 2 shows a boxplot of the percent soil removal comparing a liquid inline alkaline cleaning composition in comparison to cast solid compositions evaluated herein.

The results are shown in Table 6 and FIG. 2 where the percentage of soil removal for the cast solid composition as shown as Test and Cast, where the Test formulation was modified to further include a processing aid with modification to the polymer concentration. The data in prior examples shows cast formulations with equivalent efficacy to liquid inline formulations; however this testing demonstrated improved performance and greater consistency in soil removal by the Test formulation with the processing aid compared to the Cast formula without the processing aid.

TABLE 6

| Detergent | Avg % Soil Removed | St Deviation |
|---|---|---|
| Water | 0.589 | 0.970 |
| Inline | 98.998 | 1.130 |
| Cast | 62.637 | 36.082 |
| Test | 84.179 | 12.938 |

Example 4

Dimensional stability testing of a solid cast composition (capsules) as shown in Table 7 was conducted.

TABLE 7

| Raw Material | Amount |
|---|---|
| NaOH 50% | 20% |
| Acusol 425N | 8% |

TABLE 7-continued

| Raw Material | Amount |
|---|---|
| NaOH | 68% |
| Acusol 445N, 45% | 4% |

The capsules were put in a stability chamber that was 122° F. for 4 weeks. The change in diameter of the capsule was measured, and observed any visual changes. The changes in diameter shown were considered to be negligible. Any changes to hardness of the capsules using a penetrometer were also evaluated after the 4 weeks. The capsules were too hard to give a penetrometer reading, confirming the dimensional stability of the capsules. In addition, each week of the testing the capsules were manually tested to see if they would be easily removed from the molds (i.e. pop out) and there were no difficulties in removing the capsule at each week assessment point.

It is a significant benefit that the solid cast compositions are dimensionally stable compositions to allow formulation of the highly caustic compositions in solid form. The solid compositions provide highly concentrated alkaline solids that provide at least equivalent cleaning efficacy as liquid products without the safety concerns for transportation and handling. This overcomes a significant limitation in the art for solidifying highly caustic powders to form stable compositions.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A powder alkaline cleaning composition comprising:

an alkali metal hydroxide alkalinity source;

from about 20 wt-% to 35 wt-% of an alkali metal carbonate alkalinity source;

a first polycarboxylic acid polymer or salt or derivative thereof comprising a phosphorus end group according to the formula:

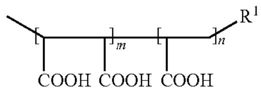

wherein $R^1$ is a phosphino (—PH(═O)(OH)) or phosphono (—P(═O)$(OH)_2$) end group, wherein m is an integer of 0 or larger, and wherein n is an integer of 2 or larger;

a second polycarboxylic acid polymer or salt or derivative thereof without a phosphorus end group and comprising a polyacrylic acid polymer and having a molecular weight of between about 2,500 g/mol and about 5,000 g/mol; and a processing aid comprising an organic solvent, wherein the composition is a free-flowing powder that does not clump and wherein the composition does not contain surfactants.

2. The powder composition of claim 1, wherein the alkali metal hydroxide comprises sodium hydroxide, and wherein the alkali metal carbonate comprises sodium carbonate.

3. The powder composition of claim 2, wherein the alkali metal hydroxide alkalinity source is a solid source.

4. The powder composition of claim 1, wherein the processing aid is propylene glycol.

5. The powder composition of claim 1, wherein the composition is free of phosphonates.

6. The powder composition of claim 1, wherein the composition comprises between about 40 wt-% and about 70 wt-% of the alkali metal hydroxide alkalinity source.

7. The powder composition of claim 1, further comprising at least one additional functional ingredient that is an additional alkalinity source, detergent builder, chelant, corrosion inhibitor, water conditioning agent, flow aid or combinations thereof.

8. The powder composition of claim 1, wherein the composition excludes additional functional ingredients.

9. The powder composition of claim 1, wherein the composition comprises between about 20 wt-% and about 30 wt-% of the alkali metal carbonate alkalinity source.

10. The powder composition of claim 1, Wherein the composition comprises between about 5 wt-% and about 20 wt-% of the first polycarboxylic acid polymer or salt or derivative thereof.

11. The powder composition of claim 1, wherein the composition comprises between about 0.1 wt-% and about 5 wt-% of the processing aid.

12. An alkaline cleaning composition comprising:

from about 20 wt-% to 35 wt-% of at least one alkali metal carbonate alkalinity source;

a first polycarboxylic acid polymer or salt or derivative thereof comprising a phosphorus end group according to the formula:

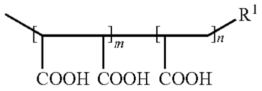

wherein $R^1$ is a phosphino (—PH(═O)(OH)) or phosphono (—P(═O)$(OH)_2$) end group, wherein m is an integer of 0 or larger, and wherein n is an integer of 2 or larger;

a second polycarboxylic acid polymer or salt or derivative thereof without a phosphorus end group and comprising a polyacrylic acid polymer and having a molecular weight of between about 2,500 g/mol and about 5,000 g/mol; and a processing aid and wherein the composition does not contain surfactants.

13. The composition of claim 12, wherein the composition comprises between about 20 wt-% and about 30 wt-% of the alkali metal carbonate alkalinity source, and between about 10 wt-% and about 40 wt-% of the first polycarboxylic acid polymer or salt or derivative thereof.

14. The composition of claim 12, wherein the composition is phosphate free.

15. The composition of claim 12, wherein the solid composition if heated at a temperature of 120° F. is dimensionally stable and has a growth exponent of less than 3%.

16. The composition of claim 12, wherein the composition excludes additional functional ingredients.

17. A method of cleaning comprising:

contacting a hard surface in need of cleaning with a use solution of the solid cleaning compositions of claim 1; and removing soils from the surface, wherein the solid cleaning composition provides at least equivalent cleaning performance to a highly alkaline liquid cleaning composition.

18. The method of claim 17, wherein the contacting is for a period of at least 2 hours.

19. The method of claim 17, wherein the soils removed include greasy and/or fatty soils.

20. The method of claim 17, wherein the method does not require use of a dispenser to provide the solid cleaning composition to the hard surface.

* * * * *